US009591698B2

(12) United States Patent
Lee et al.

(10) Patent No.: US 9,591,698 B2
(45) Date of Patent: Mar. 7, 2017

(54) INDUCTION HEATING COOKER

(71) Applicant: SAMSUNG ELECTRONICS CO., LTD., Suwon-si, Gyeonggi-do (KR)

(72) Inventors: Ji Hyeoung Lee, Seoul (KR); Joon Seok Kang, Seoul (KR); Simon Ireland, Seoul (KR); Young Seok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 14/554,345

(22) Filed: Nov. 26, 2014

(65) Prior Publication Data

US 2015/0145868 A1    May 28, 2015

(30) Foreign Application Priority Data

Nov. 26, 2013  (KR) .................. 10-2013-0144821

(51) Int. Cl.
*H05B 6/12* (2006.01)
*G06T 11/20* (2006.01)
(52) U.S. Cl.
CPC ............ *H05B 6/1218* (2013.01); *G06T 11/20* (2013.01); *H05B 2206/022* (2013.01)
(58) Field of Classification Search
CPC ...................... H05B 6/1218; G06T 11/20
See application file for complete search history.

(56) References Cited

U.S. PATENT DOCUMENTS

| 5,750,959 A | 5/1998 | Plumptre |
| 2004/0089466 A1 | 5/2004 | Schilling et al. |

FOREIGN PATENT DOCUMENTS

| JP | 2003-257601 | | 9/2003 |
| JP | 2003257601 A | * | 9/2003 |
| JP | 2008-4387 | | 1/2008 |
| JP | 2008004387 A | * | 1/2008 |
| JP | 2008-277097 | | 11/2008 |
| WO | WO 01/52603 | | 7/2001 |

OTHER PUBLICATIONS

Extended European Search Report dated Apr. 28, 2015 in corresponding European Patent Application No. 14194787.9.
European Decision on Grant dated Jun. 15, 2016 from European Patent Application No. 14194787.9, 34 pages.

* cited by examiner

*Primary Examiner* — David V Bruce
(74) *Attorney, Agent, or Firm* — Staas & Halsey LLP

(57) ABSTRACT

An induction heating cooker including reinforced heat resistant glass on which a cooking vessel is placed, an induction coil unit located under the reinforced heat resistant glass and configured to generate a magnetic field, a plurality of light emitting diodes (LEDs) provided radially outside and vertically below the induction coil unit while being spaced apart from each other along a circumferential direction of the induction coil unit, a plurality of convex lenses provided on front surfaces of the plurality of LEDs, respectively, a light blocking film provided on a lower surface of the reinforced heat resistant glass, and a slit formed in the light blocking film and allowing light radiated from the plurality of LEDs to pass therethrough, so that light radiated from the LEDs are slantingly projected to form an image of flame, which looks real, on a lower end portion of a side surface of the cooking vessel.

19 Claims, 13 Drawing Sheets

INDUCTION HEATING COOKER

CROSS-REFERENCE TO RELATED APPLICATIONS

This application claims the benefit of Korean Patent Application No. 10-2013-0144821, filed on Nov. 26, 2013, in the Korean Intellectual Property Office, the disclosure of which is incorporated herein by reference.

BACKGROUND

1. Field

Embodiments of the present disclosure relate to an induction heating cooker displaying a virtual image of flame.

2. Description of the Related Art

An induction heating cooker is a cooking appliance configured to heat foods by using the principle of induction heating. The induction heating cooker includes a cooking plate on which a cooking vessel is placed and an induction coil unit provided under the cooking plate and configured to generate a magnetic field according application of an electric current.

When an electric current is applied to the induction coil unit and a magnetic field is generated, a secondary current is induced at the cooking vessel and thus Joule's heat is generated due to resistance components of the cooking vessel. Accordingly, the cooking vessel is heated and foods contained in the cooking vessel are cooked.

Such an induction heating cooker provides faster heating, produces no harmful gas and has no danger of a fire when compared to a gas range or a kerosene cooking stove that is configured to heat a cooking vessel through heat of combustion obtained by burning fossil fuels, such as gas or oil.

However, the induction heating cooker does not produce flames in the process of heating a cooking vessel, so it is difficult to perceive a heating state of the cooking vessel from an external appearance. The general induction heating cooker is provided with a display unit configured to display a heating state of the cooking vessel. However, such a general display unit has a poor recognition quality, so it is not easy to recognize the display unit by a user located remotely from the induction heating cooker over a predetermined distance or without looking at it carefully.

SUMMARY

Therefore, it is an aspect of the present disclosure to provide an induction heating cooker capable of displaying a virtual image of flames on the cooking vessel.

Additional aspects of the disclosure will be set forth in part in the description which follows and, in part, will be apparent from the description, or may be learned by practice of the disclosure.

In accordance with one aspect of the present disclosure, an induction heating cooker includes reinforced heat resistant glass, an induction coil unit, a plurality of light emitting diodes (LEDs), a plurality of convex lenses, a light blocking film and a slit. The reinforced heat resistant glass may allow a cooking vessel to be placed thereon. The induction coil unit may be located under the reinforced heat resistant glass and configured to generate a magnetic field. The plurality of light emitting diodes (LEDs) may be provided radially outside and vertically below the induction coil unit while being spaced apart from each other along a circumferential direction of the induction coil unit. The plurality of convex lenses may be provided on front surfaces of the plurality of LEDs, respectively. The light blocking film may be provided on a lower surface of the reinforced heat resistant glass. The slit may be formed in the light blocking film and allow light radiated from the plurality of LEDs to pass therethrough.

The plurality of LEDs may be spaced apart from the induction coil unit in a radially outer side direction by 30 mm or more, and spaced apart from the reinforced heat resistant glass in a vertically lower side direction by 10 mm or more.

The plurality of LEDs may be disposed in a range of about 180 degrees to 360 degrees along a circumferential direction of the induction coil unit.

The plurality of LEDs may be controlled in a single unit, in several groups or as a whole.

A central axis of the convex lens may be provided to incline.

The central axis of the convex lens may have an inclination angle of between 40 degrees and 45 degrees.

The slit may have a ring shape.

The slit may be located radially inside the plurality of LEDs.

The slit may have a thickness of between 0.5 mm and 1 mm.

The induction heating cooker may further include a hiding band provided on an upper surface of the reinforced heat resistant glass corresponding to a vertically upper side of the slit.

The hiding band may have a ring shape.

The hiding band may have a thickness of between 4 mm and 5 mm.

The induction heating cooker may further include a heat insulating partition wall provided between the induction coil unit and the plurality of LEDs.

In accordance with one aspect of the present disclosure, an induction heating cooker includes reinforced heat resistant glass, an induction coil unit, at least one light emitting diode (LED) module, at least one cover module, a light blocking film and a slit. The reinforced heat resistant glass may allow a cooking vessel to be placed thereon. The induction coil unit may be located under the reinforced heat resistant glass and configured to generate a magnetic field. The at least one light emitting diode (LED) module may be provided radially outside and vertically below the induction coil unit while being arranged along a circumferential direction of the induction coil unit, the at least one LED module each having a printed circuit board and at least one LED mounted on the printed circuit board. The at least one cover module may be coupled to the at least one LED module, respectively, and each have at least one convex lens provided on a front surface of the at least one LED. The light blocking film may be provided on a lower surface of the reinforced heat resistant glass. The slit may be formed in the light blocking film and allow light radiated from the at least one LED module to pass therethrough.

The induction heating cooker may further include a support wall having a support surface configured to support the LED module and provided radially outside the induction coil unit.

The support surface may be provided to incline.

The at least one cover module may be provided as an integral body.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
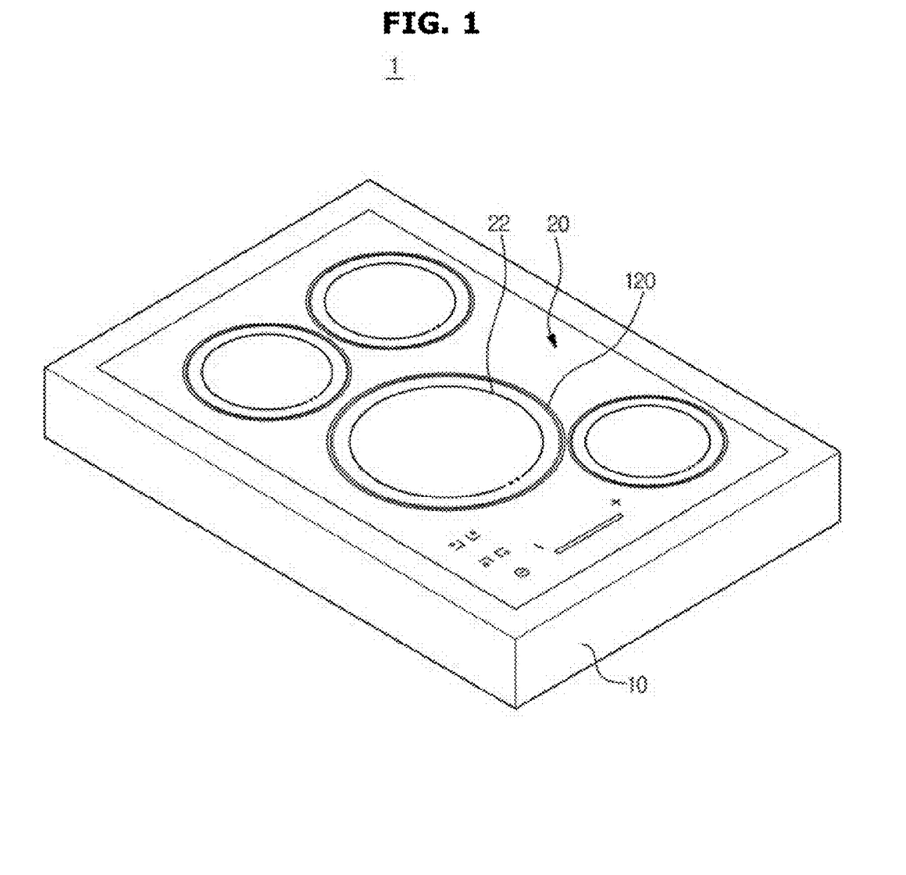
FIG. 1 is a perspective view illustrating the external appearance of an induction heating cooker according to the first embodiment of the present disclosure.
Figure 2:
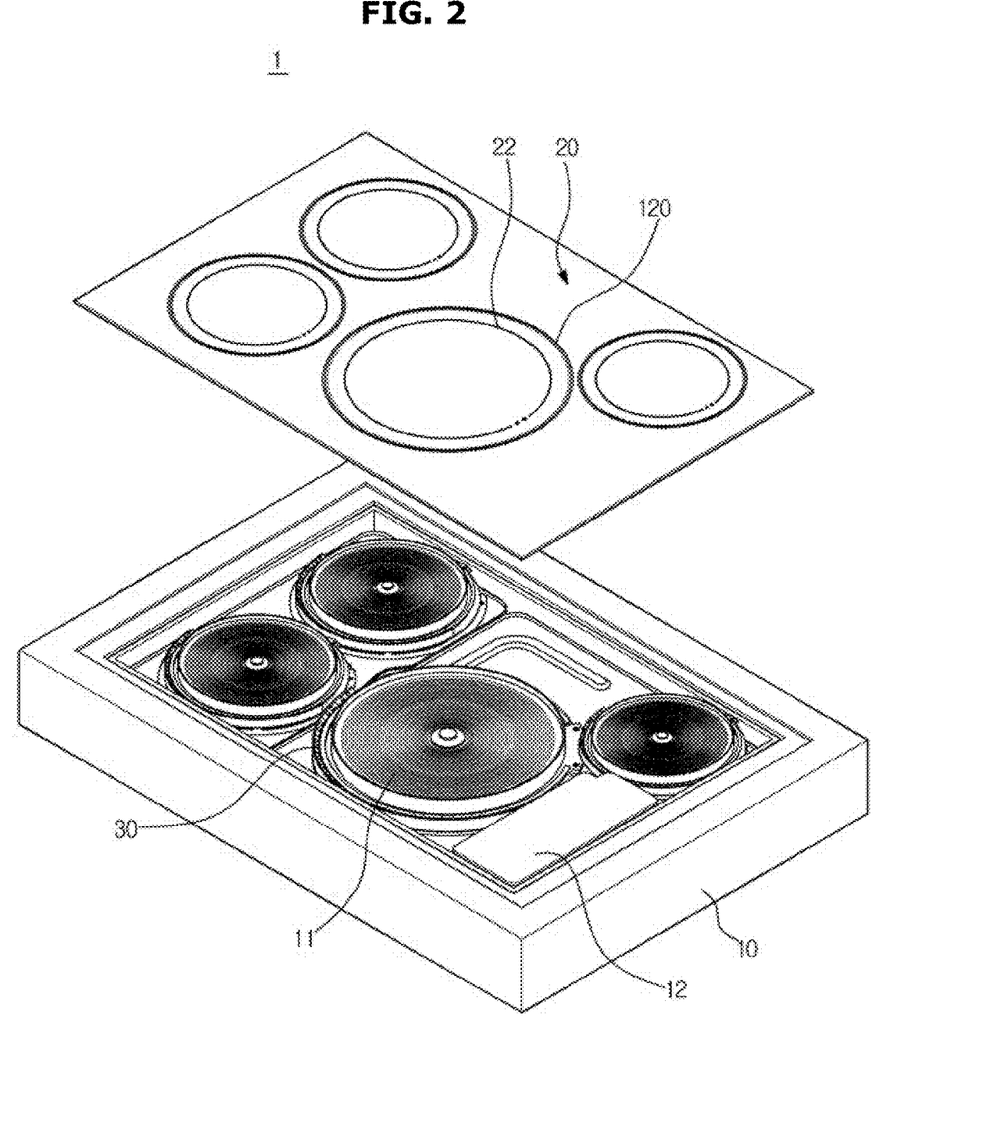
FIG. 2 is an exploded view illustrating the induction heating cooker of FIG. 1 in which a main body is separated from a reinforced heat resistant glass assembly.
Figure 3:
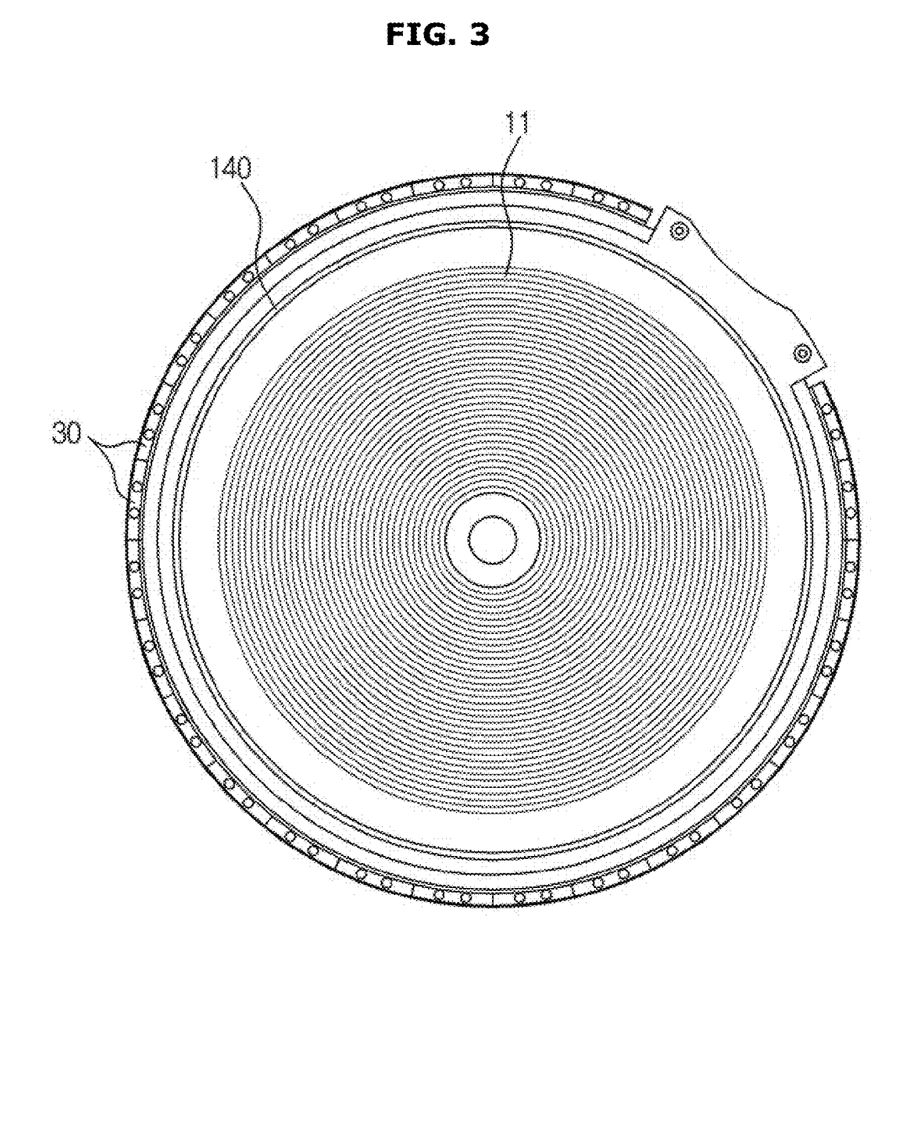
FIG. 3 is an enlarged view illustrating a placement state of light source modules of the induction heating cooker of FIG. 1.
Figure 4:
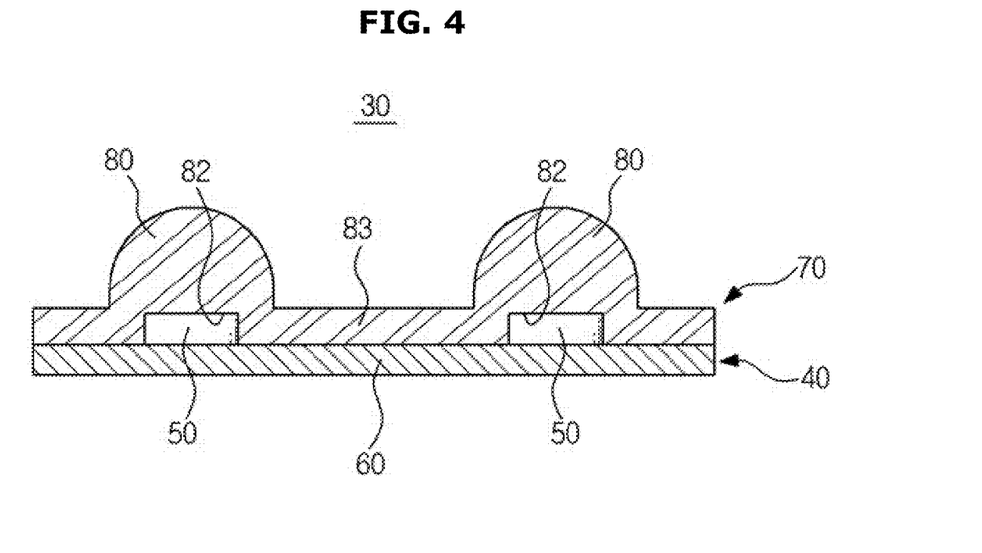
FIG. 4 is a cross sectional view showing a structure of a light source module of the induction heating cooker of FIG. 1.
Figure 5:
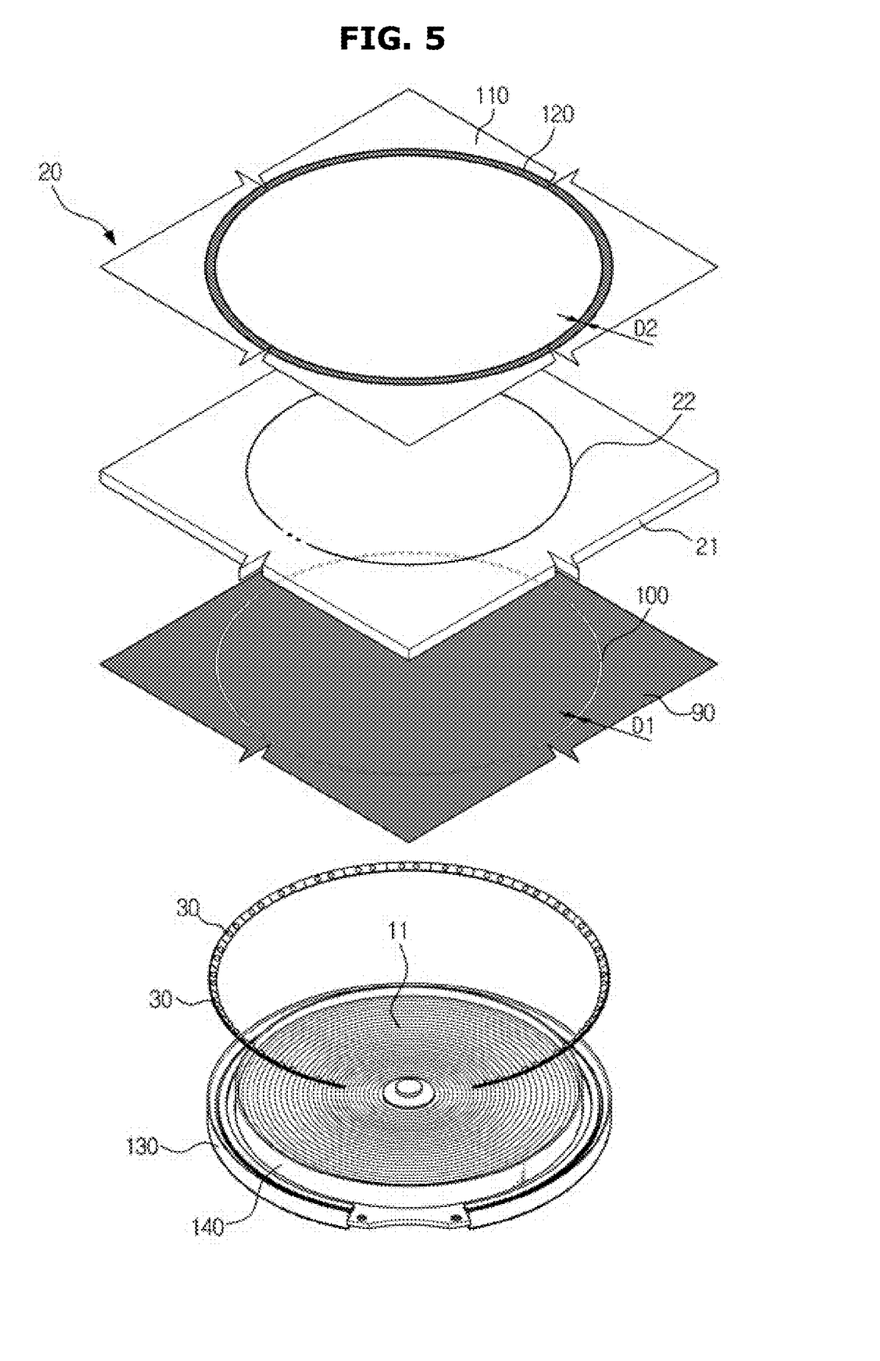
FIG. 5 is an exploded view illustrating a configuration of the induction heating cooker of FIG. 1, in which a reinforced heat resistant glass assembly, a light source module and an induction coil unit are separated from each other.
Figure 6:
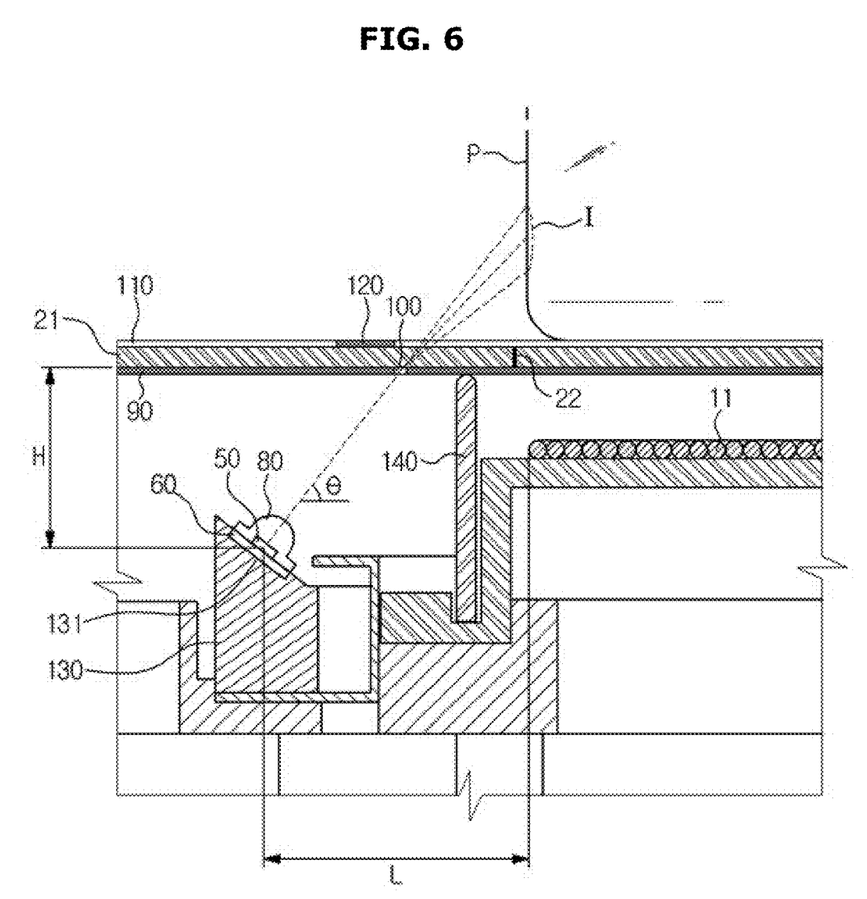
FIG. 6 is a partial cross sectional view describing an operation of the induction heating cooker of FIG. 1.
Figure 7:
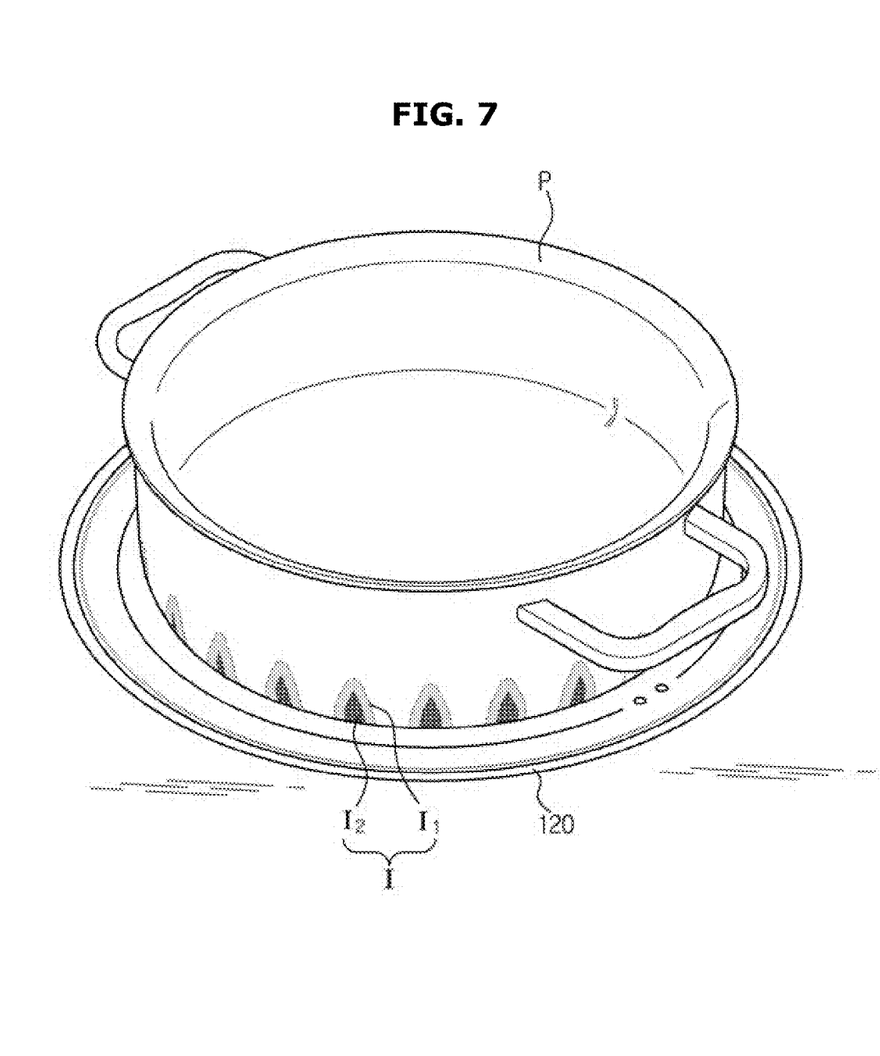
FIG. 7 is a view illustrating a flame image formed on a cooking vessel by the induction heating cooker of FIG. 1.

FIG. 1 is a perspective view illustrating the external appearance of an induction heating cooker according to the first embodiment of the present disclosure. FIG. 2 is an exploded view illustrating the induction heating cooker of FIG. 1 in which a main body is separated from a reinforced heat resistant glass assembly. FIG. 3 is an enlarged view illustrating a placement state of light source modules of the induction heating cooker of FIG. 1. FIG. 4 is a cross sectional view showing a structure of a light source module of the induction heating cooker of FIG. 1. FIG. 5 is an exploded view illustrating a configuration of the induction heating cooker of FIG. 1, in which a reinforced heat resistant glass assembly, a light source module and an induction coil unit are separated from each other. FIG. 6 is a partial cross sectional view describing an operation of the induction heating cooker of FIG. 1. FIG. 7 is a view illustrating a flame image formed on a cooking vessel by the induction heating cooker of FIG. 1.

Referring to FIGS. 1 to 7, the induction heating cooker 1 includes a main body 10 and a reinforced heat resistant glass assembly 20 provided at an upper side of the main body 10.

The main body 10 may be provided in an approximately box shape. Provided inside the main body 10 are at least one induction coil unit 11 configured to generate a magnetic field according to application of an electric current thereto, light source modules 30 provided around the induction coil unit 11 to form flame images at a lower end portion of a side surface of a cooking vessel P at the time of heating the cooking vessel P, and a machine unit 12 in which various electronic parts are accommodated.

The induction coil unit 11 includes a coil wound in an approximately circular shape so as to form a magnetic field perpendicular thereto.

The light source module 30 includes an LED module 40 and a cover module 70 coupled to the LED module 40.

The LED module 40 includes at least one LED 50 radiating light, and a printed circuit board 60 on which the at least one LED 50 is mounted. Although a single LED module 40 according to the embodiment of the present disclosure is illustrated as including two units of the LEDs 50, the present disclosure is not limited thereto. For example, according to other embodiments that will be described later, a single LED module may include three or more LEDs 50, or only one LED 50.

According to the embodiment of the present disclosure, a single unit of the LED 50 forms a single flame image I on the cooking vessel P. To this end, the LEDs 50 may be provided while being spaced apart from each other at an equal interval.

The type and shape of the LED 50 are not limited. For example, the LED 50 may include at least one LED element (not shown), a molding part (not shown) to protect the at least one LED element and an electrode part (not shown) for connection with the external power source. In addition, the LED 50 may include a red LED element, a green LED element and a blue LED element, to implement various colors when required.

The cover module 70 has at least one convex lens 80 provided on a front surface of each of the at least one LED 50. The cover module 70 according to the embodiment of the present disclosure includes two convex lenses 80 and a connection part 83 connecting the two convex lenses 80 to each other. However, the configuration of the cover module 70 is not limited thereto. For example, the cover module 70 may include three or more convex lenses 80 arranged in a line or may include only a single convex lens 80.

The LED module 40 may be coupled to the cover module 70 in various schemes, and the coupling scheme is not limited. For example, the LED module 40 may be coupled to the cover module 70 by using a fitted protrusion structure or an adhesive member.

The cover module 70 may have a bottom surface thereof come into close contact with the printed circuit board 60. The cover module 70 may be provided with accommodating grooves 82 that are open downward to accommodate the LEDs 50 of the LED module 40.

The convex lens 80 is provided in an approximately solid semi-spherical shape. According to the embodiment of the present disclosure, the convex lens 80 is configured to condense light radiated from the LED 50, and a curvature of the convex lens 80 is properly designed to condense light.

For example, when light is radiated from the LED 50 with a beam angle of about 120 degrees, the beam angle is narrowed in to about 45 degrees to 65 degrees while the light passes through the convex lens 80.

In addition, a width of a flame image I formed on the cooking vessel P is determined by the diameter of the convex lens 80, and thus the diameter of the convex lens 80 may be properly designed to make a flame image I appear real.

Since the light radiated from the LED 50 is condensed by the convex lens 80, the directivity of light is improved, and even if the power of the LED 50 is not adjusted, light having an intensity strong enough to form a flame image I on the cooking vessel P is obtained.

The cover module 70 is formed of resin, and may be provided as an integral body.

The induction heating cooker 1 according to the embodiment of the present disclosure has the plurality of light source modules 30 provided radially outside the induction coil unit 11 while being arranged in a circumferential direction. Accordingly, the induction heating cooker 1 includes the plurality of LEDs 50 and the plurality of convex lenses 80 provided on front surfaces of the plurality of LEDs 50.

The LEDs 50 are provided radially outside the induction coil unit 11 while being spaced apart from each other in a circumferential direction. Although the LEDs 50 according to the embodiment of the present disclosure are illustrated as being arranged in a range of about 300 degrees along the circumferential direction, the present disclosure is not limited thereto, and the LEDs 50 may be arranged in a range between about 180 degrees and about 360 degrees along the circumferential direction depending on specification.

Figure 13:
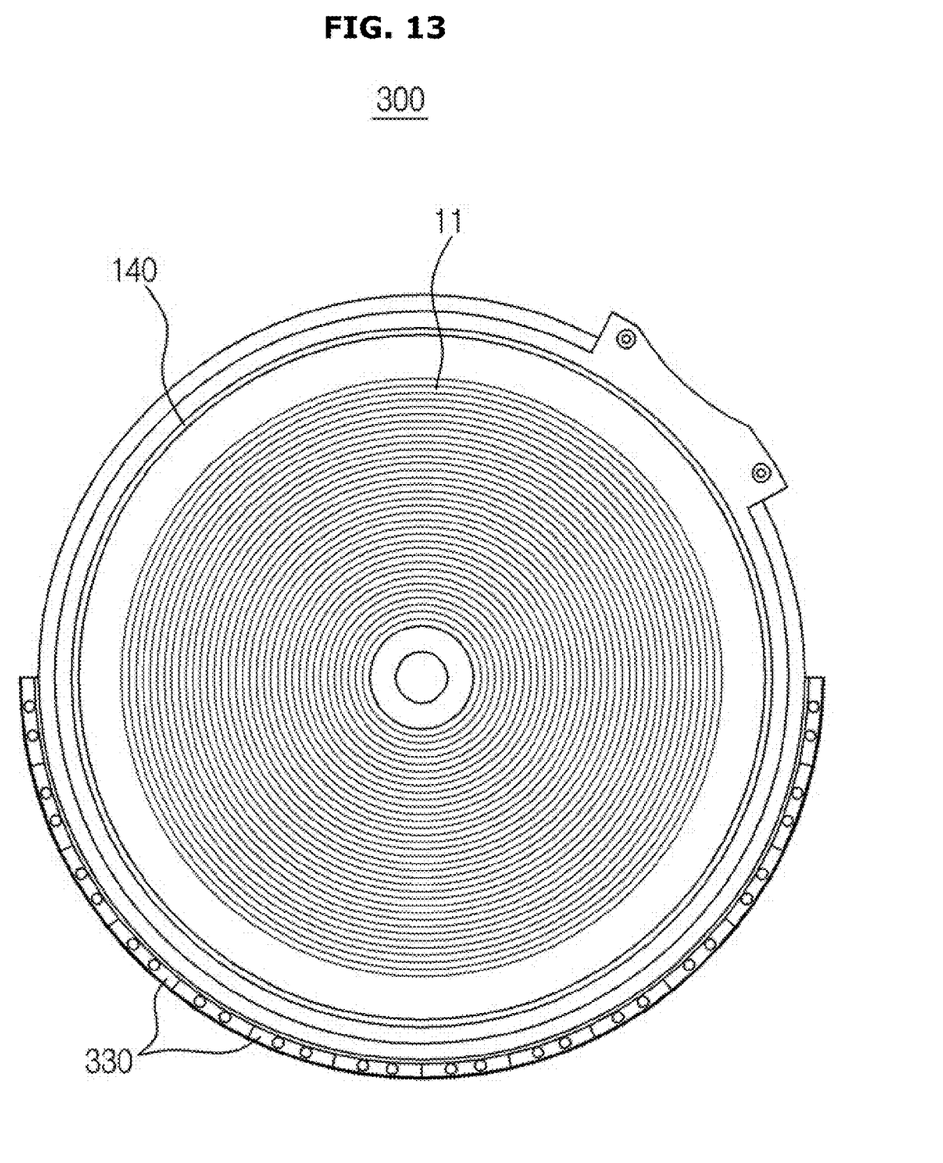
FIG. 13 is a view describing a placement of a light source module of an induction heating cooker according to the third embodiment of the present disclosure.

For example, light source modules 330 of an induction heating cooker 300 according to the third embodiment of the present disclosure are arranged in a range of about 180 degrees along the circumferential direction. Accordingly, LEDs are also arranged in a range of about 180 degrees along the circumferential direction. In practice, a user only views an area in a range of 180 degrees in front of the cooking vessel P. Accordingly, even if the LEDs are arranged only in a range of 180 degrees in front of the induction heating cooker, the effect of the present disclosure is achieved.

To continue with description of the first embodiment of the present disclosure, the LEDs 50 provided radially outside the induction coil unit 11 while being arranged in the circumferential direction are positioned vertically below the reinforced heat resistant glass 21. Accordingly, light radiated from the LEDs 50 is slantingly transmitted toward the lower end portion of the cooking vessel P.

The LEDs 50 may be spaced apart from the induction coil unit in a radially outer direction 11 by a distance of about 30 mm or above (denoted as L in FIG. 6), and spaced apart from the reinforced heat resistant glass 21 in a vertically lower direction by a distance of about 10 mm or above (denoted as H in FIG. 6).

Accordingly, a central axis of each of the convex lenses 60 provided on the front surfaces of the LEDs 50 is provided to incline. The inclination angle formed between the central axis of the convex lens 80 and a horizontal surface is about 40 degrees or above and 45 degrees or below. The central axis of each convex lens 80 may pass through the slit 100.

The induction heating cooker 1 according to the embodiment of the present disclosure includes a support wall 130 supporting the LED module 40. The support wall 130 is provided radially outside the induction coil unit 11 while forming a concentric circle with the induction coil unit 11.

The support wall 130 includes a support surface 131 supporting the LED module 40, and the support surface 131 may be provided to incline.

The reinforced heat resistant glass assembly 20 is coupled to an upper surface of the main body 10 that is open. The reinforced heat resistant glass assembly 20 includes reinforced heat resistant glass 21 provided in the form of a flat panel on which the cooking vessel P is placed, a light blocking film 90 provided on a lower surface of the reinforced heat resistant glass 21 and an upper film 110 provided on an upper surface of the reinforced heat resistant glass 21.

The reinforced heat resistant glass 21 has a predetermined mechanical strength and heat resistance, and has transparence allowing light to pass therethrough. In the induction heating cooker 1 according to another embodiment of the present disclosure, a ceramic panel having a predetermined mechanical strength and heat resistance and transparence may be used instead of the reinforced heat resistant glass 21.

A vessel guide line 22 indicating a proper position in the cooking vessel P may be provided on the reinforced heat resistant glass 211.

The light blocking film 90 is formed of opaque material, to block light radiated from the LED 50 from transmitted upward of the reinforced heat resistant glass 21. The light blocking film 90 may have a color of black. The light blocking film 90 is provided with a slit 100 allowing light to pass therethrough.

The slit 100 is provided in a ring shape that forms an approximately concentric circle with the induction coil unit 11. The slit 100 may be provided in the form of a closed ring having an angle of 360 degrees, or an open ring whose both ends are open and having an angle of less than 360 degrees. The slit 100 is continuously formed without being broken in the middle thereof.

The slit 100 is provided radially inside of the LEDs 50, and allows a central axis of each convex lens 80 to pass therethrough. Accordingly, light passing through the slit 100 may be refracted and diffused to form a flame image I on a lower end portion of a side surface of the cooking vessel P.

The height of the flame image I is determined by the thickness D1 of the slit 100, and the thickness D1 may be 0.5 mm or above and 1 mm or below.

Such a light blocking film 90 may be provided on the lower surface of the reinforced heat resistant glass 21 in a printing scheme or an attachment scheme.

The upper film 110 provided on the upper surface of the reinforced heat resistant glass 21 is formed of transparent material. The upper film 110 is provided with a hiding band 120 having an opaque color such that the LEDs 50 and the slit 100 are hidden. The hiding band 120 may be provided in a color of black.

The hiding band 120 is provided in the shape of a ring forming an approximately concentric circle with the induction coil unit 11, and provided vertically above the slit 100. In detail, the hiding band 120 is provided to extend radially outward from a position of the upper film 110 corresponding to a vertically upper side of the slit 100.

The thickness D2 of the hiding band 120 may be about 4 mm or above and 5 mm or below. The hiding band 120 prevents light passing through the slit 100 to be directly viewed a user, thereby preventing the existence of the LED 50, representing a light source, and the slit 100 from being recognized by a user.

As the LED 50 and the slit 100 are hidden by the hiding band 120, degradation of aesthetic quality due to unnecessary radiation of light is prevented and realistic flame image I is implemented.

The upper film 110 may be provided on the upper surface of the reinforcement heat resistant glass 21 in a printing scheme or an attachment scheme.

Although the hiding band 120 according to the embodiment is formed on the upper film 110 without protruding upward of the reinforced heat resistant glass 21, the hiding band 120 is not limited thereto. For example, the hiding band 120 may be formed on the upper surface of the reinforced heat resistant glass 21 and the upper film 110 may be omitted.

Meanwhile, the induction heating cooker 11 according to the embodiment of the present disclosure may further include a heat insulating partition wall 140 provided between the induction coil unit 11 and the plurality of LEDs 50 to prevent heat generated from the induction coil unit 11 from being transmitted to the LEDs 50.

The heat insulating partition wall 140 may be provided in a ring shape that forms a concentric circle with the induction coil unit 11. As described above, in the induction heating cooker 1 according to the embodiment of the present disclosure, the LEDs 50 are radially and outwardly spaced apart from the induction coil unit 11, and the heat insulating partition wall 140 is provided in a gap between the LEDs 50 and the induction coil unit 11.

The heat generated from the induction coil unit 11 is blocked by the heat insulting partition wall 140, thereby preventing the LEDs 50 from being damaged.

Referring to FIG. 7, in the induction heating cooker 1 according to the embodiment of the present disclosure, the flame image I formed on the lower end portion of the side surface of the cooking vessel P has the same height and width as those of actual flames, and also has the same volume appearance and shading as those of actual flames.

As described above, since the height of the flame image I is associated with the thickness D1 of the slit 100, and the width of the flame image I is associated with the diameter of the convex lens 60, the thickness D1 of the slit 100 and the diameter of the convex lens 80 may be properly adjusted to form a flame image I that looks real.

In addition, since light radiated from the LED 50 is condensed through the convex lens 80, the flame image I has a surface flame I1 and a reduces flame I2 similar to the real flames. That is, the reduced flame I2 formed in the center and has light condensed thereon to present a bright color, and the surface flame I1 has a dark color, so that the flame image I has a three dimensional effect and shading.

Figure 8:
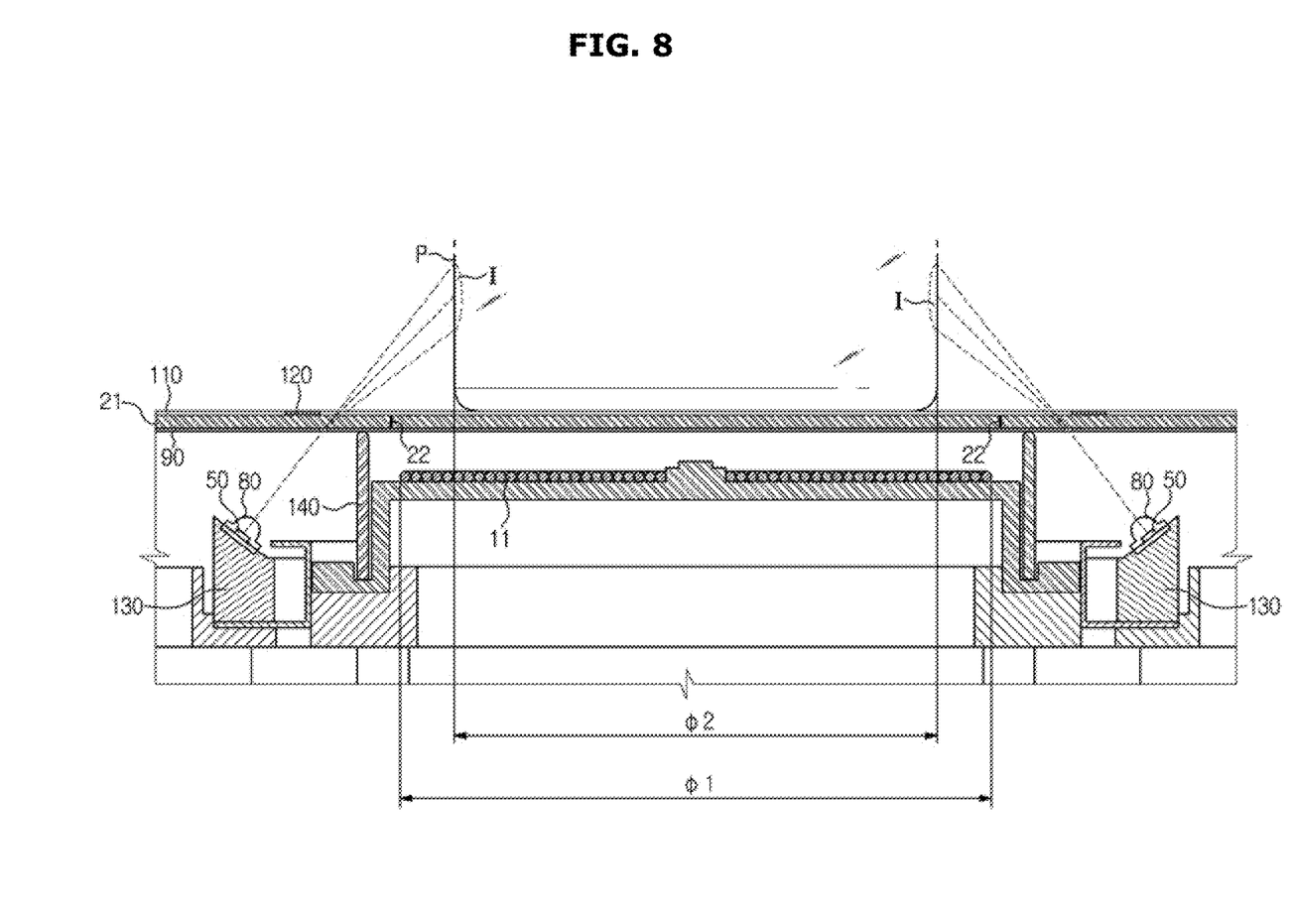
FIG. 8 is a view illustrating a flame image formed on a cooking vessel placed on the induction heating cooker of FIG. 1, in which the cooking vessel has a diameter smaller than a predetermined diameter.
Figure 9:
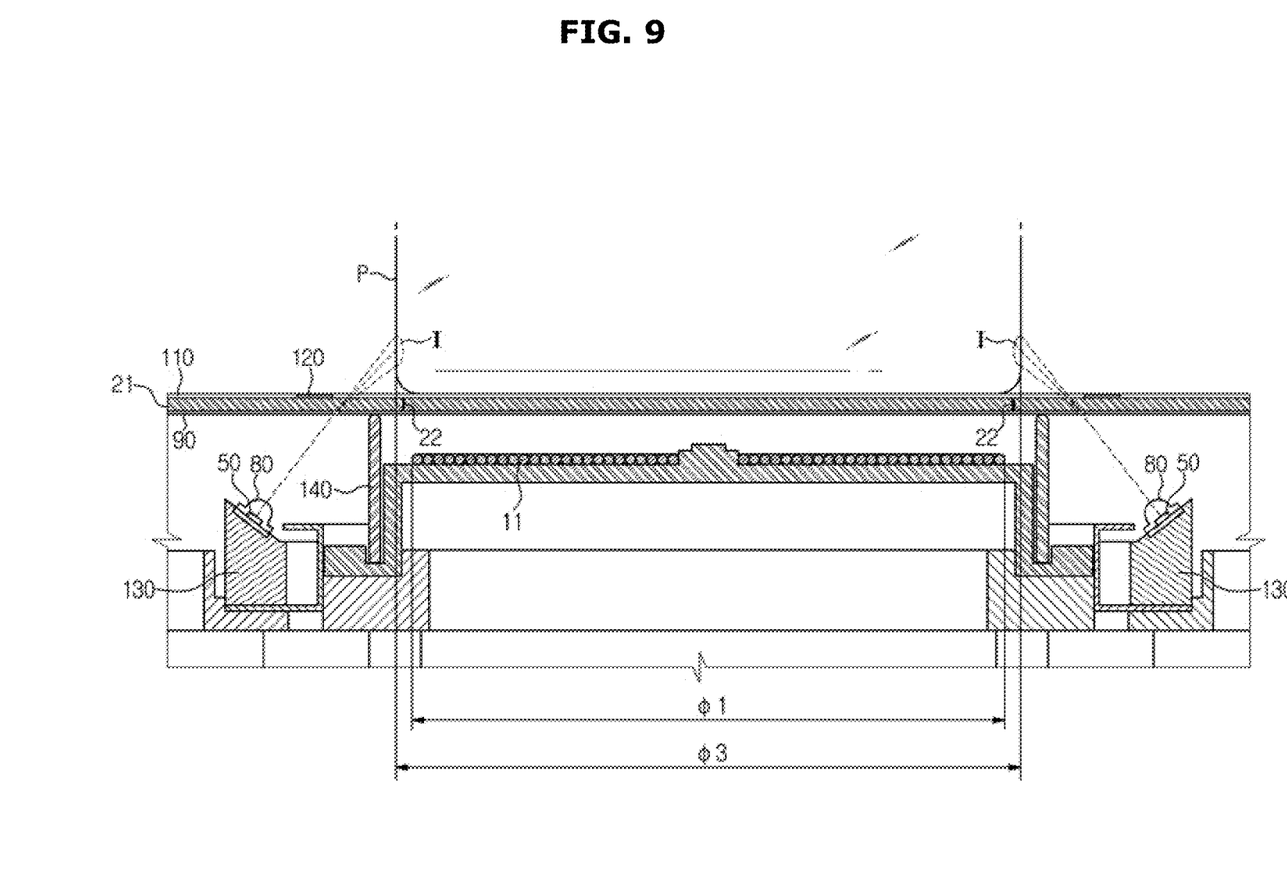
FIG. 9 is a view illustrating a flame image formed on a cooking vessel placed on the induction heating cooker of FIG. 1, in which the cooking vessel has a diameter larger than a predetermined diameter.
Figure 10:
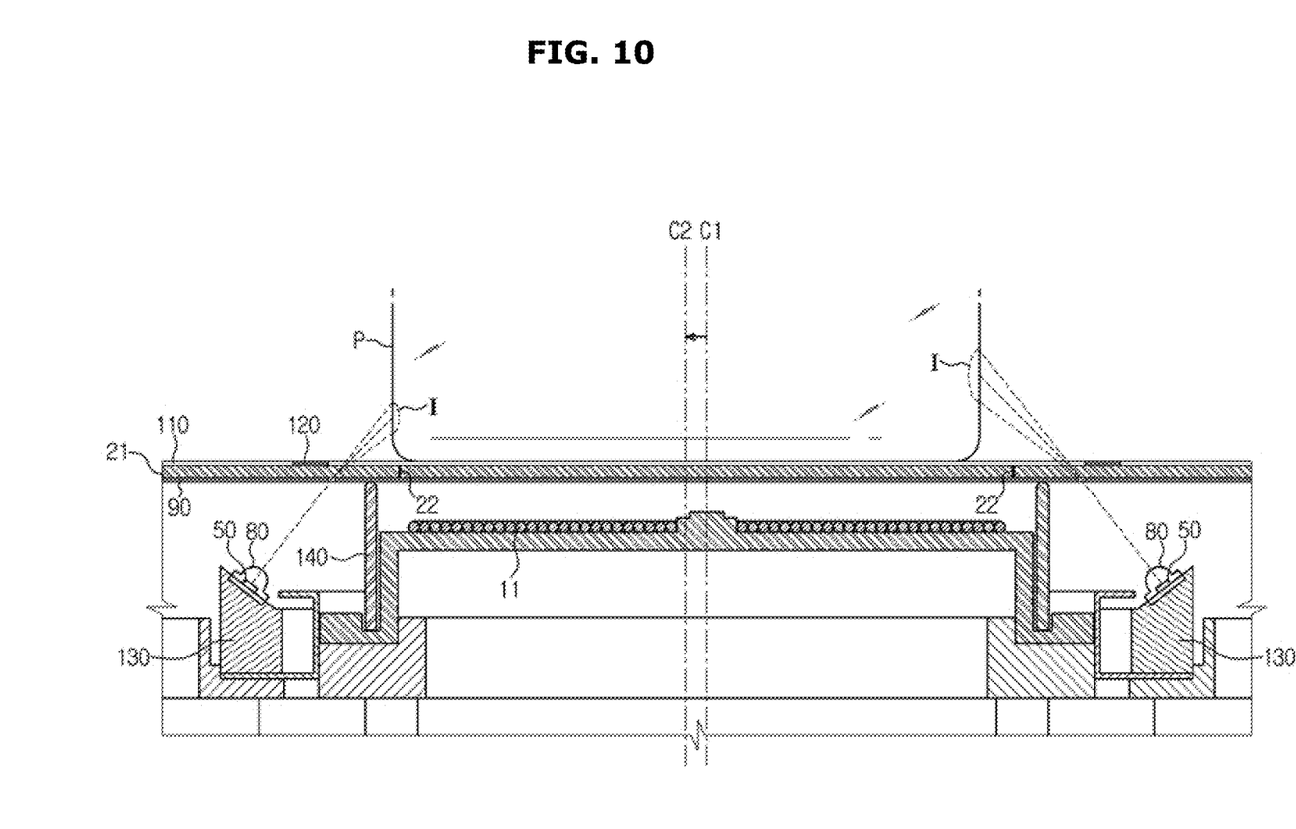
FIG. 10 is a view illustrating an example of a flame image formed on a cooking vessel disposed at a side away from a reference line.
Figure 11:
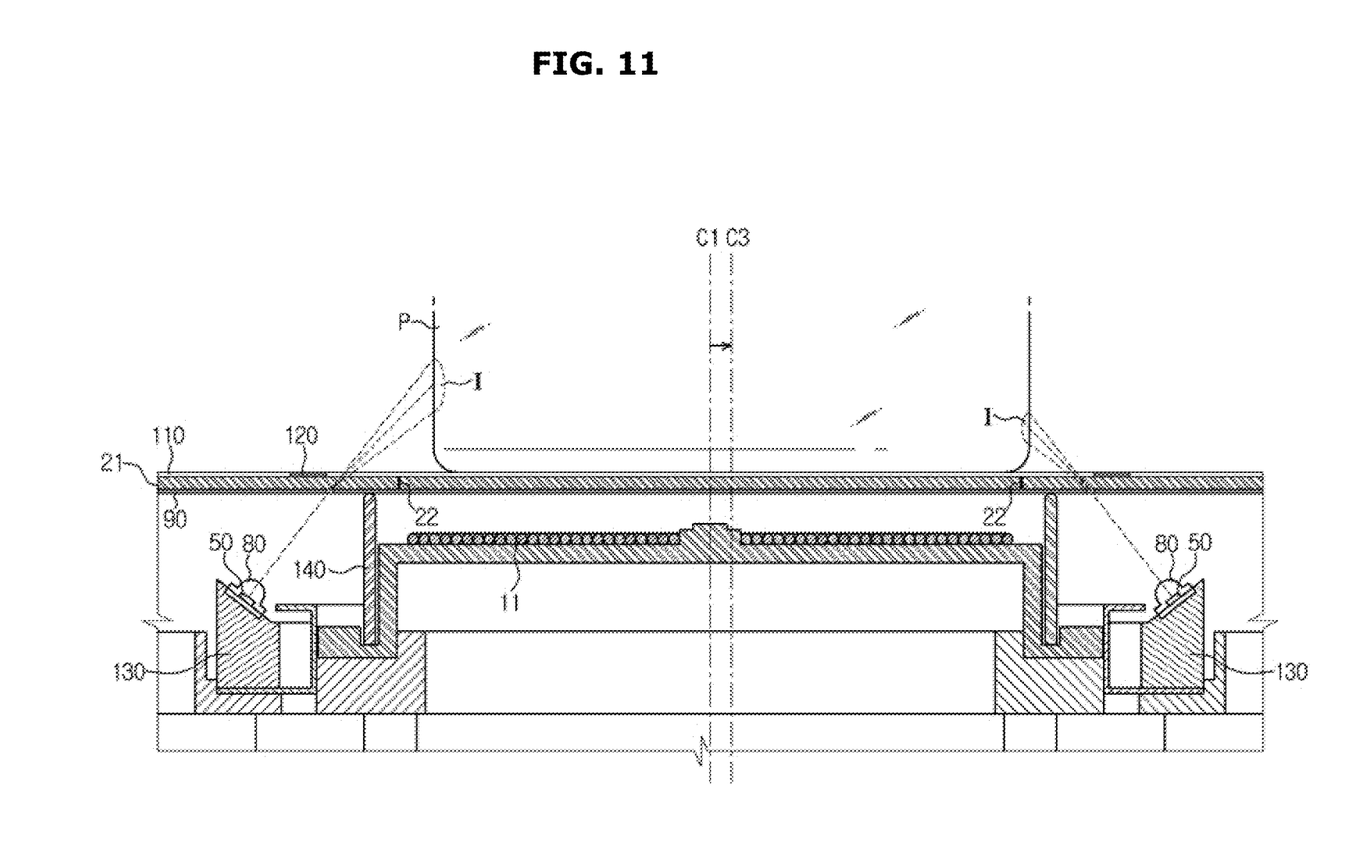
FIG. 11 is a view illustrating another example of a flame image formed on a cooking vessel disposed at a side away from a reference line.

FIG. 8 is a view illustrating a flame image formed on a cooking vessel placed on the induction heating cooker of FIG. 1, in which the cooking vessel has a diameter smaller than a predetermined diameter, FIG. 9 is a view illustrating a flame image formed on a cooking vessel placed on the induction heating cooker of FIG. 1, in which the cooking vessel has a diameter larger than a predetermined diameter, FIG. 10 is a view illustrating an example of a flame image formed on a cooking vessel disposed at a side away from a reference line, and FIG. 11 is a view illustrating another example of a flame image formed on a cooking vessel disposed at a side away from a reference line.

Referring to FIGS. 8 to 11, various examples of operations of the induction heating cooker 1 will be described. Hereinafter, the cooking vessel P may be different at each drawing, but the same reference numeral may be used to refer to the different cooking vessels P.

As described above, the induction heating cooker 1 according to the embodiment of the present disclosure has a structure of forming a flame image I on the cooking vessel by allowing light radiated from the LED 50 to be slantingly transmitted. Accordingly, the degree of freedom to the size design and the placement of the cooking vessel P may be improved.

As an example shown in FIG. 8 in which even when the cooking vessel P has an actual diameter of φ2 smaller than a predetermined size φ1, light radiated from the LED 50 is projected onto the lower end portion of the side surface of the cooking vessel P, so that a flame image I is formed. In general, the predetermined diameter φ1 of the cooking vessel P may be substantially equal to the diameter of the induction coil unit 11.

In contrary, as shown in FIG. 9 in which even when the cooking vessel P has an actual diameter of φ3 larger than the predetermined size φ1, light radiated from the LED 50 is projected onto the lower end portion of the side surface of the cooking vessel P, so that a flame image I may be formed.

According to the embodiment of the present disclosure, the flame image I may be formed on the lower end portion of the side surface of the cooking vessel P if an actual diameter of the cooking vessel P is provided in a range between 80% and 105% of the predetermined diameter of the cooking vessel P.

Referring to FIGS. 10 and 11, the flame image I may be formed on the lower end portion of the side surface of the cooking vessel even if the central axis C2 and C3 of the cooking vessel P is disposed at a side away from a reference line C1, since light radiated from the LED 50 is slantingly transmitted. The reference line C1 may coincide with a center line of the induction coil unit 11.

Accordingly, there is no need to match the central axis C2 and C3 of the cooking vessel P with the reference line C1 to form the flame image I. According to the embodiment of the present disclosure, the flame image I may be formed even if the central axis of the cooking vessel P is deviated about ⅕ of the diameter of the cooking vessel P.

Figure 12:
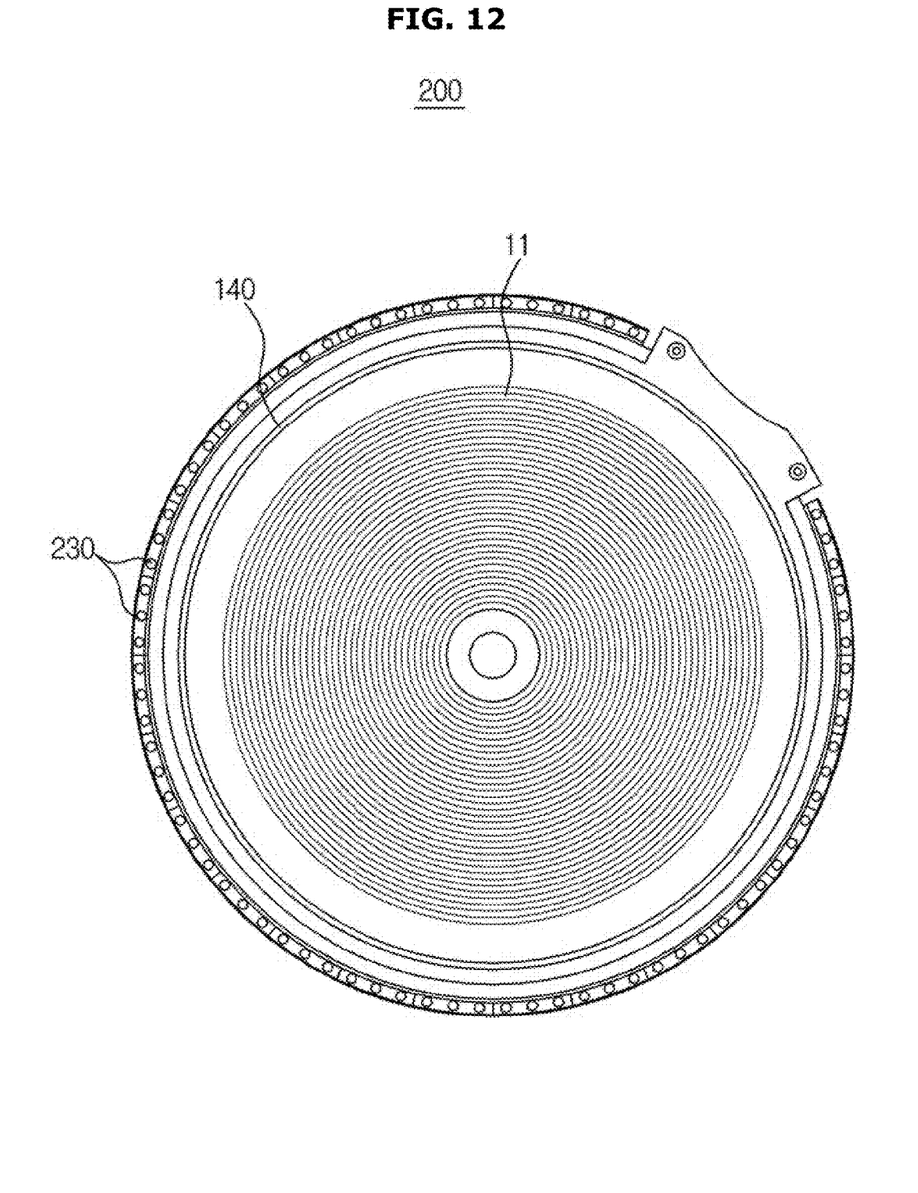
FIG. 12 is a view describing a structure of a light source module of an induction heating cooker according to the second embodiment of the present disclosure.

FIG. 12 is a view describing a structure of a light source module of an induction heating cooker according to the second embodiment of the present disclosure, and FIG. 13 is a view describing a placement of a light source module of an induction heating cooker according to the third embodiment of the present disclosure.

Referring to FIGS. 12 and 13, light source modules according to the second and third embodiments of the present disclosure will be described. In the following description, the same reference numerals may be used to refer to parts identical to those described in the first embodiment, and the description of the parts will be omitted.

Referring to FIG. 12, light source modules 230 of an induction heating cooker 200 according to the second embodiment of the present disclosure may each include an LED module and a cover module coupled to the LED module. The LED module includes a printed circuit board and three LEDs mounted on the printed circuit board. The cover module includes three convex lenses provided on the front surfaces of the three LEDs.

That is, the light source module 230 according to the second embodiment of the present disclosure may be provided as an integral body while including the three LEDs and the three convex lenses, different from the light source module of the first embodiment.

In addition, although not shown, the light source module may be provided as an integral body while including four or more LEDs and four or more convex lenses, or provided as an integral body while including a single LED and a single convex lens.

Referring to FIG. 13, light source modules 330 of an induction heating cooker 300 according to the third embodiment of the present disclosure may be arranged in a range of 180 degrees along the circumferential direction of the induction heating cooker 300. In this case, the arrangement position of the light source modules may be in front of the induction heating cooker 300.

As described above, the rear of the induction heating cooker 300 is not seen by a user while being blocked by the cooking vessel P. Accordingly, the light modules 330 may be disposed within a range of 180 degrees or above without the need to be disposed even at the rear of the induction heating cooker 300, which enhances the economic efficiency.

As is apparent from the above, the induction heating cooker can allow a user to intuitively recognize the heating state of the cooking vessel by forming an image of flame at a lower end portion of a side surface of the cooking vessel.

In this case, the image of flame formed on the cooking vessel has the same height, width and volume appearance and shading as real flames, so that the perceived quality of the cooker can be improved.

Since light radiated from light emitting diodes and slantingly traveling forms an image at a lower end portion of a side surface of a cooking vessel, an image formation can be achieved even if the cooking vessel has a size slightly smaller or larger than a predetermined size, or the cooking vessel is disposed at a side away from a reference point, thereby improving the degree of freedom to the size design and the placement of the cooking vessel.

Various flame images can be provided in an individual flickering manner or a sequential flickering manner by controlling a plurality of LEDs in a single unit or in groups.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An induction heating cooker comprising:
   reinforced heat resistant glass on which a cooking vessel is placed;
   an induction coil unit located under the reinforced heat resistant glass and configured to generate a magnetic field;
   a plurality of light emitting diodes (LEDs) provided radially outside and vertically below the induction coil unit while being spaced apart from each other along a circumferential direction of the induction coil unit;
   a printed circuit board which the plurality of LEDs are mounted thereon;
   a plurality of convex lenses provided on front surfaces of the plurality of LEDs, respectively;
   a light blocking film provided on a lower surface of the reinforced heat resistant glass; and
   a slit formed in the light blocking film and allowing light radiated from the plurality of LEDs to pass therethrough.

2. The induction heating cooker of claim 1, wherein the plurality of LEDs are spaced apart from the induction coil unit in a radially outer side direction by 30 mm or above, and spaced apart from the reinforced heat resistant glass in a vertically lower side direction by 10 mm or above.

3. The induction heating cooker of claim 1, wherein the plurality of LEDs are disposed in a range between about 180 degrees and about 360 degrees along a circumferential direction of the induction coil unit.

4. The induction heating cooker of claim 1, wherein the plurality of LEDs are controlled as individual LEDs, as groups of LEDs or as a whole.

5. The induction heating cooker of claim 1, wherein a central axis of the convex lens is inclined.

6. The induction heating cooker of claim 5, wherein the central axis of the convex lens has an inclination angle of between 40 degrees and 45 degrees.

7. The induction heating cooker of claim 1, wherein the slit has a ring shape.

8. The induction heating cooker of claim 1, wherein the slit is located radially inside the plurality of LEDs.

9. The induction heating cooker of claim 1, wherein the slit has a thickness of between 0.5 mm and 1 mm.

10. The induction heating cooker of claim 1, further comprising a hiding band provided on an upper surface of the reinforced heat resistant glass corresponding to a vertically upper side of the slit.

11. The induction heating cooker of claim 10, wherein the hiding band has a ring shape.

12. The induction heating cooker of claim 10, wherein the hiding band has a thickness of 4 mm or above and 5 mm or below.

13. The induction heating cooker of claim 1, further comprising a heat insulating partition wall provided between the induction coil unit and the plurality of LEDs.

14. An induction heating cooker comprising:
    reinforced heat resistant glass on which a cooking vessel is placed;
    an induction coil unit located under the reinforced heat resistant glass and configured to generate a magnetic field;
    at least one light emitting diode (LED) module provided radially outside and vertically below the induction coil unit while being arranged along a circumferential direction of the induction coil unit, the at least one LED module each having a printed circuit board and at least one LED mounted on the printed circuit board;
    at least one cover module coupled to the at least one LED module, respectively, and each having at least one convex lens provided on a front surface of the at least one LED;
    a light blocking film provided on a lower surface of the reinforced heat resistant glass; and
    a slit formed in the light blocking film and allowing light radiated from the at least one LED module to pass therethrough.

15. The induction heating cooker of claim 14, further comprising a support wall having a support surface configured to support the LED module and provided radially outside the induction coil unit.

16. The induction heating cooker of claim 15, wherein the support surface is inclined.

17. The induction heating cooker of claim 14, wherein the at least one cover module is provided as an integral body.

18. A method of displaying a virtual image on a cooking vessel placed on an induction heating cooker having a reinforced heat resistant glass on which the cooking vessel is placed;
    generating a magnetic field through an induction coil unit located under the reinforced heat resistant glass;
    mounting a plurality of light sources on a printed circuit board so that the plurality of light sources are disposed outside and below the induction coil unit;
    emitting light through the plurality of light sources through a plurality of convex lenses on to a side of the cooking vessel.

19. The method of claim 18, wherein at least one of the plurality of convex lenses is configured to condense light radiated from the plurality of light sources and project light on to the side of the cooking vessel so that the virtual image is a flame shape.

* * * * *